US012562539B2

(12) United States Patent
Crockett et al.

(10) Patent No.: US 12,562,539 B2
(45) Date of Patent: Feb. 24, 2026

(54) MULTI-VOLTAGE POWER OVER UNIVERSAL SERIAL BUS

(71) Applicant: Toshiba Global Commerce Solutions, Inc., Durham, NC (US)

(72) Inventors: Timothy Crockett, Raleigh, NC (US); Kimberly Wood, Raleigh, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 207 days.

(21) Appl. No.: 18/126,780

(22) Filed: Mar. 27, 2023

(65) Prior Publication Data

US 2024/0332877 A1 Oct. 3, 2024

(51) Int. Cl.
*H01R 27/02* (2006.01)
*H01R 13/64* (2006.01)
*H01R 43/26* (2006.01)
*H01R 107/00* (2006.01)

(52) U.S. Cl.
CPC ............. *H01R 27/02* (2013.01); *H01R 13/64* (2013.01); *H01R 43/26* (2013.01); *H01R 2107/00* (2013.01)

(58) Field of Classification Search
CPC ........ H01R 27/02; H01R 13/64; H01R 43/26; H01R 2107/00
USPC .......................................................... 439/638
See application file for complete search history.

(56) References Cited

U.S. PATENT DOCUMENTS 6,334,793 B1 * 1/2002 Amoni ................. H01R 13/645 439/639
8,690,608 B2 4/2014 Naito
9,143,032 B2 9/2015 Le
9,418,032 B2 8/2016 Terlizzi
9,437,984 B2 9/2016 Golko
2003/0073342 A1 * 4/2003 Geyer .................... H01R 25/00 439/489

(Continued)

FOREIGN PATENT DOCUMENTS

EP 2984743 11/2019

OTHER PUBLICATIONS

Unknown, Retail USB/USB PlusPower/USB +Power—Electro-Mechanical Specification Version 0.8g, 2005, PoweredUSB.org (available at http://www.poweredusb.org/pdf/PoweredUSB_v08g.pdf).

*Primary Examiner* — Gary F Paumen
(74) *Attorney, Agent, or Firm* — Kaufman & Canoles P.C.

(57) ABSTRACT

Systems and methods of providing multi-voltage power over USB are disclosed. In one exemplary embodiment, a USB receptacle device includes upper and lower receptacle connection portions and a mechanical key structure. Each portion has a set of longitudinal contacts composed of a conducting material. Further, one of the set of longitudinal contacts of the lower receptacle connection portion is configured to provide a first voltage and two of the set of longitudinal contacts of the upper receptacle connection portion are configured to provide second and third voltages, with the second and third voltages being different voltages. The mechanical key structure is disposed in the upper receptacle connection portion and has a set of longitudinal keys configured in a certain key arrangement. Each key arrangement represents a certain assignment of the second and third voltages provided at the two of the set of longitudinal contacts of the upper receptacle connection portion.

19 Claims, 11 Drawing Sheets

(56) References Cited

U.S. PATENT DOCUMENTS

| | | | | |
|---|---|---|---|---|
| 2007/0243769 | A1* | 10/2007 | Atsmon | H01R 12/721 439/660 |
| 2013/0145043 | A1* | 6/2013 | Guo | G06F 16/29 709/245 |
| 2014/0013024 | A1* | 1/2014 | Lamm | H01R 31/06 710/313 |
| 2018/0375313 | A1* | 12/2018 | Misener | H01R 13/665 |
| 2019/0372366 | A1* | 12/2019 | Liu | G06F 1/26 |
| 2021/0257793 | A1* | 8/2021 | Bosma | H01R 13/648 |

* cited by examiner

300b

| | Pin# | | | | | | | | |
|---|---|---|---|---|---|---|---|---|---|
| Key | 1 | 2 | 3 | 4 | 5 | 6 | 7 | 8 | Color |
| 1 | VBUS | D- | D+ | GUSB | GND | 12V | 12V | GND | #00BFB3 |
| 2 | VBUS | D- | D+ | GUSB | GND | 24V | 24V | GND | #EF3340 |
| 3 | VBUS | D- | D+ | GUSB | GND | 5V | 5V | GND | #D9D9D6 |
| 4 | VBUS | D- | D+ | GUSB | GND | 3.3V | 3.3V | GND | #92D050 |
| 1+2 | VBUS | D- | D+ | GUSB | GND | 12V | 24V | GND | #ED7D31 |
| 1+3 | VBUS | D- | D+ | GUSB | GND | 5V | 12V | GND | #7030A0 |
| 2+3 | VBUS | D- | D+ | GUSB | GND | 5V | 24V | GND | #FFFF00 |
| 1+4 | VBUS | D- | D+ | GUSB | GND | 3.3V | 12V | GND | TBD |
| 2+4 | VBUS | D- | D+ | GUSB | GND | 3.3V | 24V | GND | TBD |
| 3+4 | VBUS | D- | D+ | GUSB | GND | 3.3V | 5V | GND | TBD |

FIG. 3B

300d

| Key | Pin# | | | | | | | | Color |
|---|---|---|---|---|---|---|---|---|---|
| | 1 | 2 | 3 | 4 | 5 | 6 | 7 | 8 | |
| 1 | VBUS | D- | D+ | GUSB | GND | 12V | 12V | GND | #00BFB3 |
| 2 | VBUS | D- | D+ | GUSB | GND | 24V | 24V | GND | #EF3340 |
| 3 | VBUS | D- | D+ | GUSB | GND | 5V | 5V | GND | #D9D9D6 |
| 4 | VBUS | D- | D+ | GUSB | GND | 3.3V | 3.3V | GND | #92D050 |
| 1+2 | VBUS | D- | D+ | GUSB | GND | 12V | 24V | GND | #ED7D31 |
| 1+3 | VBUS | D- | D+ | GUSB | GND | 5V | 12V | GND | #7030A0 |
| 2+3 | VBUS | D- | D+ | GUSB | GND | 5V | 24V | GND | #FFFF00 |
| 1+4 | VBUS | D- | D+ | GUSB | GND | 3.3V | 12V | GND | TBD |
| 2+4 | VBUS | D- | D+ | GUSB | GND | 3.3V | 24V | GND | TBD |
| 3+4 | VBUS | D- | D+ | GUSB | GND | 3.3V | 5V | GND | TBD |

FIG. 3D

MULTI-VOLTAGE POWER OVER UNIVERSAL SERIAL BUS

BACKGROUND

Universal Serial Bus (USB) is an industry standard that establishes specifications for cables, connectors, and protocols for connection, communication and power supply interfacing between devices (e.g., computers, peripherals, hardware). USB was originally designed to standardize the connection of peripherals to personal computers, as well as to communicate with and to supply power. USB has largely replaced other types of input/output interfaces (e.g., serial ports, parallel ports) and has become ubiquitous on a wide range of devices (e.g., keyboards, mice, video cameras, printers, media players, smartphones, disk drives, network adapters). USB +Power, which may also be referred to as PoweredUSB, Retail USB, USB PlusPower, and USB Power Plus, is an extension to the USB industry standard that allows for devices to obtain power through their USB interface instead of requiring an independent power supply, external alternating current (AC) adapter, or voltage regulator circuit.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

Figure 1A:
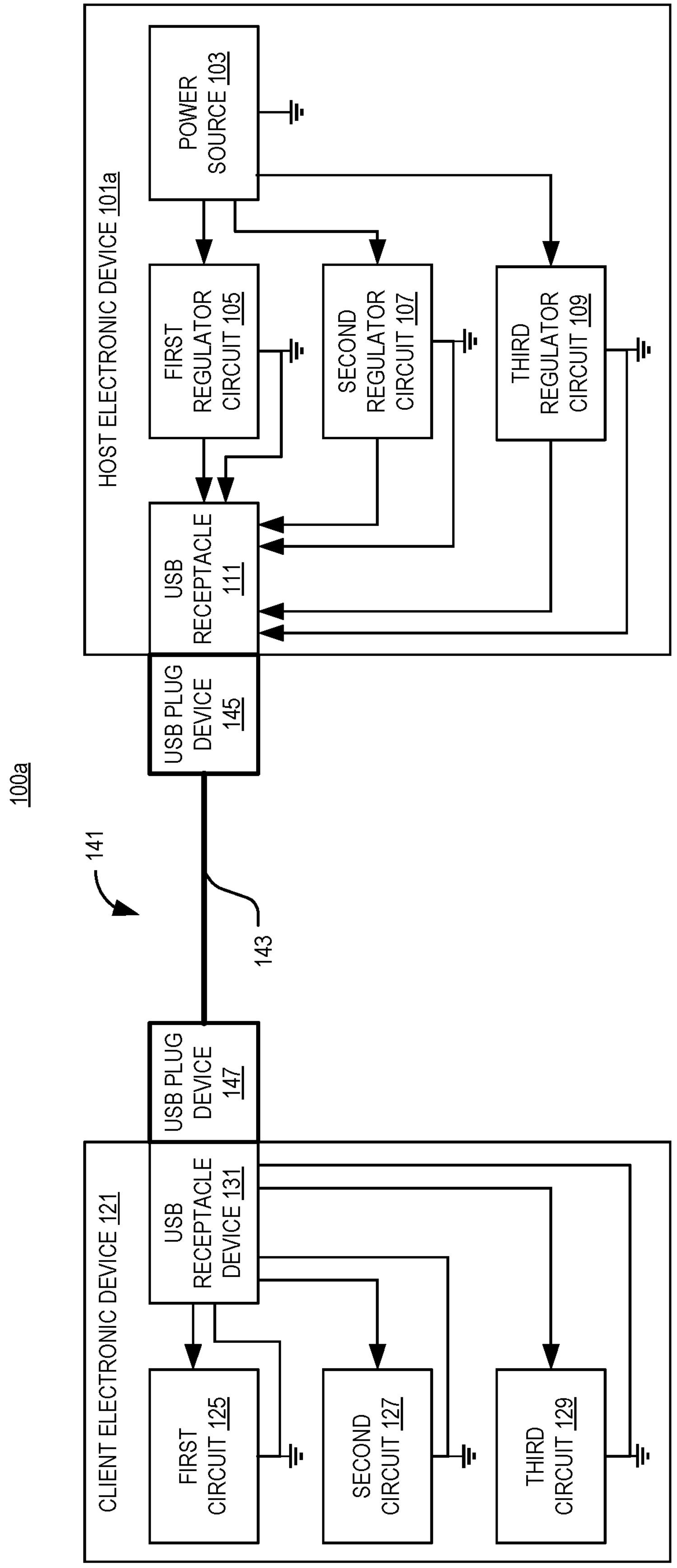
FIGS. 1A-B illustrate embodiments of a system having a host electronic device coupled to a client electronic device over a USB connection device in accordance with various aspects as described herein.
Figure 1B:
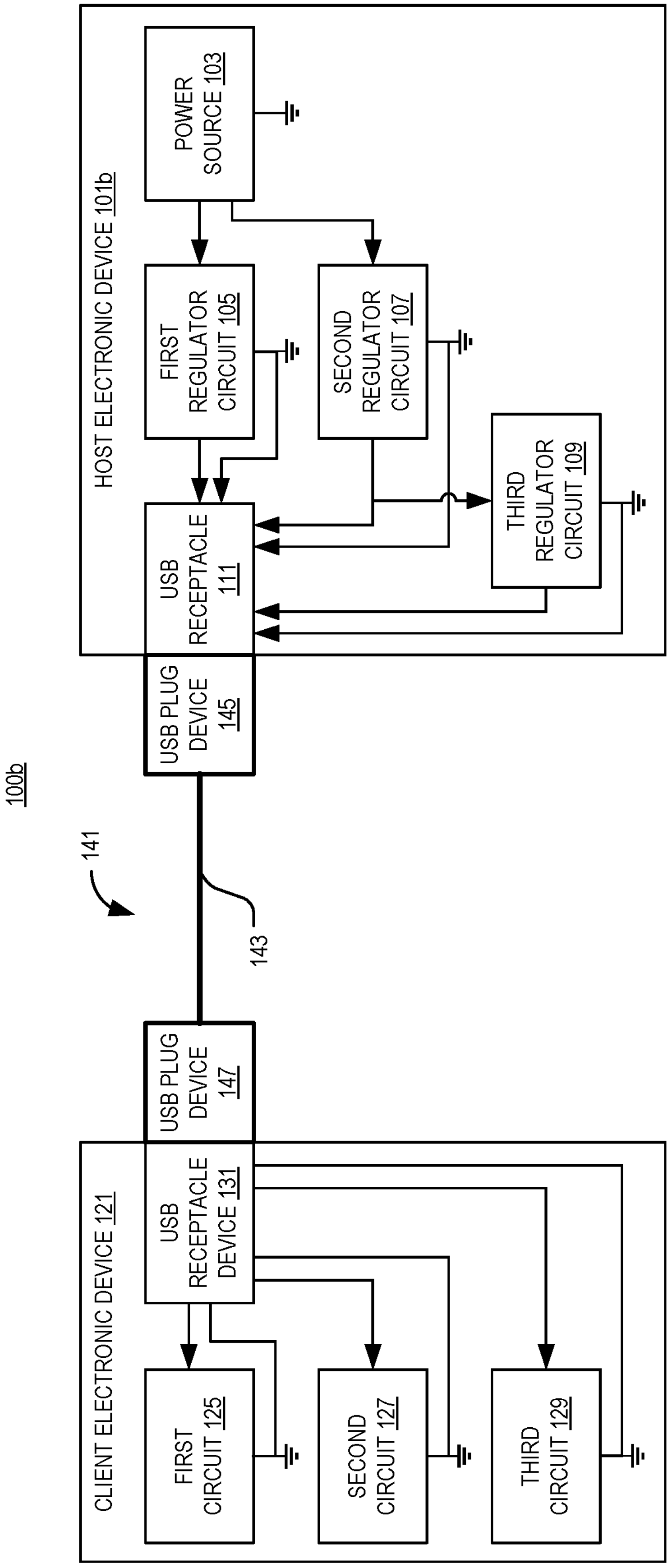

The USB +Power interface currently provides a first pair of power and ground pins configured to provide five volts (5V) at up to five hundred milliamps (500 mA) over a standard USB-A connector and a second pair of power and ground pins configured to provide five volts (5V), twelve volts (12V) or twenty-four volts (24V) at up to six amps (6 A) over the USB +Power interface, from a host electronic device to a client electronic device. As such, the client electronic device is limited to receive only these voltages unless an additional voltage regulator circuit is added to the client electronic device, which increases cost, resource usage, and design complexity. Further, many applications require far less current than six amps allowed over the USB +Power interface. Accordingly, embodiments described herein include techniques and methods to provide an additional voltage(s) from the host electronic device to the client electronic device over the USB +Power interface. For example, FIGS. 1A-B illustrate embodiments of a system 100*a,b* that includes a host electronic device 101*a,b* coupled to a client electronic device 121 over a USB connection device 141 in accordance with various aspects as described herein. In FIGS. 1A-B, the host electronic device 101*a,b* can include a power source 103, first, second and third voltage regulator circuits 105, 107, 109, and a USB receptacle device 111. The power source 103 can be configured to provide direct current (DC) power to components of the device 101*a,b*. The first voltage regulator circuit 105 includes a first input terminal, a first output terminal and a first ground terminal and is operable to regulate a first input voltage (e.g., 5 Volts) received at the first input terminal to provide a first output voltage (e.g., 1.2V, 1.5V, 3.3V, 5V, 12V, 24V) output at the first output terminal. The second voltage regulator circuit 107 can include a second input terminal, a second output terminal and a second ground terminal and can be operable to regulate a second input voltage (e.g., 5V, 12V, 24V) received at the second input terminal to provide a second output voltage (e.g., 1.2V, 1.5V, 3.3V, 5V, 12V, 24V) output at the second output terminal. The third voltage regulator circuit 109 can include a third input terminal, a third output terminal and a third ground terminal and can be operable to regulate the second input voltage or the second output voltage received at the third input terminal to provide a third output voltage (e.g., 1.2V, 1.5V, 3.3V, 5V, 12V, 24V) output at the third output terminal. In FIG. 1A, the first, second and third voltage regulator circuits 105, 107, 109 can be configured to regulate the same or a different voltage provided by the power source 103. In FIG. 1B, the first and second voltage regulator circuits 105, 107 can be configured to regulate the same or a different voltage provided by the power source 103. Further, the third voltage regulator circuit 109 can be configured to regulate the output voltage of the second voltage regulator circuit 107. Alternatively, the second and third voltage regulator circuits 107, 109 can be configured to regulate a voltage provided by the power source 103.

In FIGS. 1A-B, the USB receptacle device 111 can be configured to releasably couple with a USB plug device 145 and can include upper and lower receptacle connection portions disposed within a housing, with each receptacle connection portion having a set of longitudinal contacts composed of a conducting material. Further, the USB receptacle device 111 can include a mechanical key structure composed of an insulating material and disposed in the upper receptacle connection portion. The mechanical key structure can include a set of longitudinal keys configured in a certain key arrangement, with each key arrangement representing a certain assignment of voltages output at two or more of the set of longitudinal contacts of the upper receptacle connection portion. The mechanical key structure can be configured to be selectively mated and removed along an axis parallel to the set of longitudinal keys with a reciprocal mechanical key structure of the USB plug device.

Furthermore, each of the first output terminal and the corresponding ground terminal of the first regulator circuit 105 can be electronically coupled to a certain one of the set of longitudinal contacts of the lower receptacle connection portion of the USB receptacle device 111. Also, each of the second and third output terminals and the corresponding ground terminals of the respective second and third regulator circuits 107, 109 can be electronically coupled to a certain one of the set of longitudinal contacts of the upper receptacle connection portion of the USB receptacle device 111 so as to enable the USB plug device 145 when releasably coupled to the USB receptacle device 111 (such that the mechanical key structure is selectively mated to the reciprocal mechanical key structure of the USB plug device 111) to output the first, second and third output voltages and the corresponding grounds from the host electronic device 101*a,b* to the client electronic device 121 over the USB connection device 141.

In FIGS. 1A-B, the client electronic device 121 can include first, second and third circuits 125, 127, 129 and an USB receptacle device 131, which may or may not have a mechanical key structure. The first, second and third circuits 125, 127, 129 can have first, second and third voltage terminals and corresponding ground terminals. The USB receptacle device 131 can be configured to releasably couple with a USB plug device 147, which may or may not include a reciprocal mechanical key structure in conformance with the USB reciprocal device 131. Each of the first voltage terminal and the corresponding ground terminal of the first circuit 125 can be electronically coupled to a certain one of the set of longitudinal contacts of the lower receptacle connection portion of the USB receptacle device 131. Further, each of the second and third voltage terminals and the corresponding ground terminals of the second and third circuits 127, 129 can be electronically coupled to a certain one of the set of longitudinal contacts of the upper receptacle connection portion of the USB receptacle device 131 so as to enable the host electronic device 101*a,b* to provide the first, second and third voltages to the client electronic device 121 over the USB connection device 141.

In another embodiment, the third voltage regulator circuit 109 can be operable to regulate the second output voltage received at the third input terminal to provide the third output voltage at the third output terminal with the third output voltage being less than the second output voltage.

In another embodiment, the second and third voltage regulators 107, 109 can be configured to have a combined output current of no more than a first current threshold (e.g., 6 Amps).

In another embodiment, each of the second and third voltage regulator circuits 107, 109 can be configured to output current of no more than a second current threshold (e.g., 3 A).

In another embodiment, the first current threshold (e.g., 3 A) is two times the second current threshold (e.g., 6 A).

In another embodiment, the first and second input voltages are the same voltage.

In another embodiment, each set of longitudinal contacts has four longitudinal contacts and the set of longitudinal keys has two keys.

In another embodiment, the lower receptacle connection portion can be configured to releasably couple a USB Type A connector.

In another embodiment, the host electronic system can include a printed circuit board (PCB), with each pair of the output voltage terminals and the corresponding ground terminals of the first, second and third voltage regulator circuits being coupled to corresponding power and ground planes of that PCB.

In another embodiment, the set of longitudinal contacts of the upper receptacle connection portion of the USB receptacle device 111 can be configured as follows: the first contact is coupled to the third ground terminal of the third voltage regulator circuit 109, the second contact is coupled to the third output terminal of the third voltage regulator circuit 109, the third contact is coupled to the second ground terminal of the second voltage regulator circuit 107, and the fourth contact is coupled to the second output terminal of the second voltage regulator circuit 107. In addition, the set of longitudinal contacts of the mechanical key structure are positioned adjacently below and parallel to two of the first, second, third and fourth contacts of the upper receptacle connection portion of the USB receptacle device 111.

In another embodiment, the set of longitudinal contacts of the lower receptacle connection portion of the USB receptacle device 111 can be configured as follows: the first contact is coupled to the first ground terminal of the first voltage regulator circuit 105, and the fourth contact is coupled to the first output terminal of the first voltage regulator circuit 105.

In another embodiment, the USB receptacle device 111 can be enabled to output a voltage at the sixth contact of 1.2 volts, 1.5 volts, 3.3 volts, 5 volts or 12 volts and to output a voltage at the seventh contact of 24 volts.

In another embodiment, the USB receptacle device 111 can be enabled to output a voltage at the sixth contact of 1.2 volts, 1.5 volts, 3.3 volts or 5 volts and to output a voltage at the seventh contact of 12 volts.

In another embodiment, the USB receptacle device 111 can be enabled to output a voltage at the sixth contact of 1.2 volts, 1.5 volts, or 3.3 volts and to output a voltage at the seventh contact of 5 volts.

In another embodiment, each arrangement of the set of longitudinal keys of the mechanical key structure can correspond to a certain voltage assignment at the sixth and seventh contacts.

In another embodiment, a method of assembling a USB receptacle device can include identifying a mechanical key structure having a set of longitudinal keys configured in a certain key arrangement that corresponds to a certain assignment of voltages output at two or more of the set of longitudinal contacts of an upper receptacle connection portion. The method can further include attaching the mechanical key structure to the upper receptacle connection portion.

In another embodiment, a method of assembling a USB plug device can include identifying a mechanical key structure having a set of longitudinal keys configured in a certain key arrangement that corresponds to a certain assignment of voltages output at two or more of the set of longitudinal contacts of an upper plug connection portion. The method can further include attaching the mechanical key structure to the upper plug connection portion.

In another embodiment, the second and third voltages are different voltages.

In another embodiment, the first, second and third voltages are different voltages.

In another embodiment, the second voltage is greater than the first and third voltages.

In another embodiment, the second voltage (e.g., 12V, 24V) is greater than the first and third voltages and the first voltage (e.g., 5V) is greater than the third voltage (e.g., 1.2V, 1.5V, 3.3V).

In another embodiment, the second voltage (e.g., 24V) is greater than the first and third voltages and the third voltage (e.g., 12V) is greater than the first voltage (e.g., 5V).

In another embodiment, the second voltage (e.g., 12V, 24V) is greater than the first and third voltages and the first voltage (e.g., 5V) is the same as the third voltage (e.g., 5V).

In another embodiment, the first and second voltages are the same voltage (e.g., 5V) and greater than the third voltage (e.g., 1.2V, 1.5V, 3.3V).

Figure 2A:
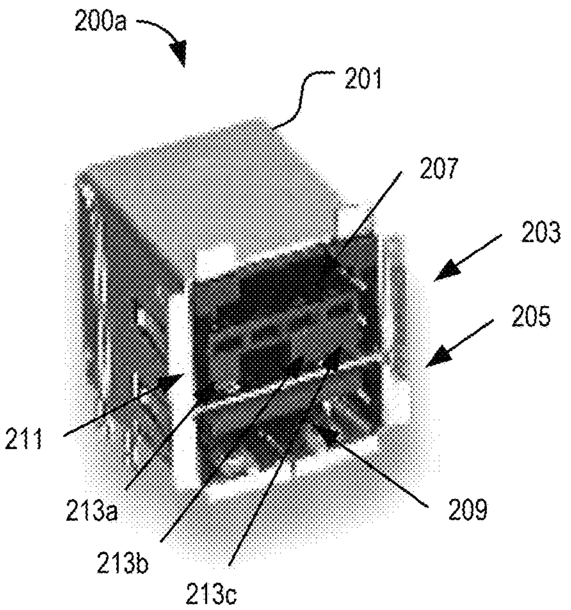
FIG. 2A illustrate one embodiment of a USB receptacle device in accordance with various aspects as described herein. FIB. 2B illustrates one embodiment of a USB plug device in accordance with various aspects as described herein.
Figure 3A:
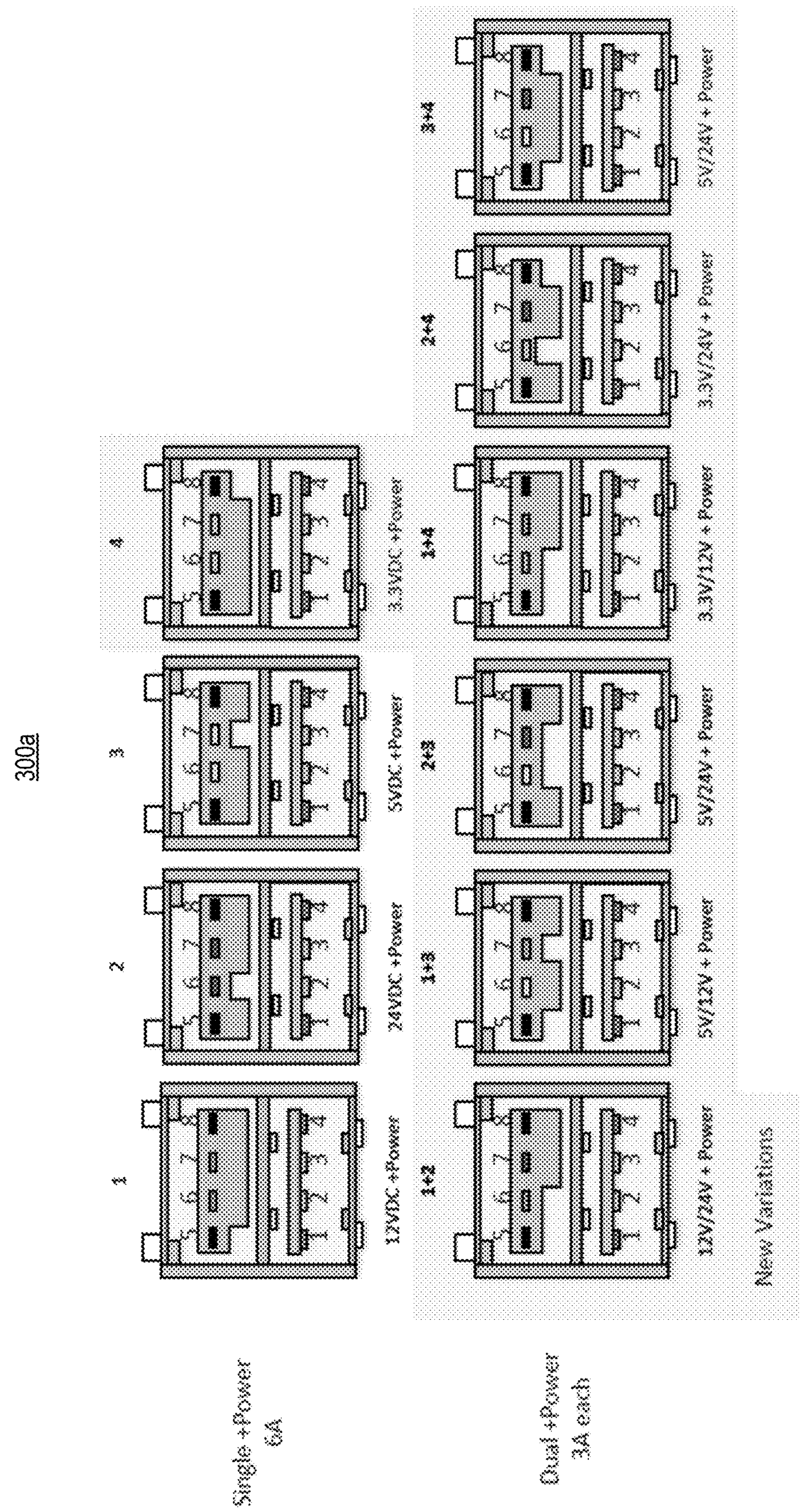
FIG. 3A illustrates embodiments of key arrangements of a mechanical key structure of a USB receptacle device and corresponding voltage assignments on Pin #6 and Pin #7 of the upper receptacle connection portion of the USB receptacle device. FIB. 3B is a table summarizing the key arrangements and the corresponding voltage assignments of the USB receptacle device embodiments of FIG. 3A.

FIG. 2A illustrate one embodiment of a USB receptacle device 200*a* in accordance with various aspects as described herein. In FIG. 2A, the device 200*a* can be configured to include upper and lower receptacle connection portions 203, 205 disposed within a housing 201. Further, each receptacle connection portion 203, 205 can have a set of longitudinal contacts 207, 209 composed of a conducting material. One of the set of longitudinal contacts 209 of the lower receptacle connection portion 205 can be configured to provide a first voltage (e.g., 5V) and two of the set of longitudinal contacts 207 of the upper receptacle connection portion 203 can be configured to provide second and third voltages such as represented by respective Pin #7 and Pin #6 columns of Table 300b. The device 200*a* can further include a mechanical key structure 211 disposed in the upper receptacle connection portion 203 and composed of an insulating material, with the mechanical key structure 211 having a set of longitudinal keys 213*a-c* configured in a certain key arrangement such as shown by the various embodiments of FIG. 3A. Each key arrangement can represent a certain voltage assignment of the second and third voltages provided at the two of the set of longitudinal contacts 207 of the upper receptacle connection portion 203. For example, FIG. 3A illustrates embodiments of key arrangements of a mechanical key structure of a USB receptacle device and corresponding voltage assignments on Pin #6 and Pin #7 of an upper receptacle connection portion of the USB receptacle device. Further, FIB. 3B is a table summarizing the key arrangements and the corresponding voltage assignments of the USB receptacle device embodiments of FIG. 3A. Each key 213*a-c* can be positioned adjacently below and parallel to a certain one of the set of longitudinal contacts 207 of the upper receptacle connection portion 203. In addition, the mechanical key structure 211 can be configured to be selectively mated and removed along an axis parallel to the set of longitudinal keys 213*a-c* with a reciprocal mechanical key structure of a USB plug device. The purpose of this key arrangement structure is to prevent a USB plug device configured for a certain voltage assignment from being coupled with a USB receptacle device having a different voltage assignment. Further, the USB receptacle device and the USB plug device can be color coded specific to the voltage assignment for those devices.

In another embodiment, the lower receptacle connection portion 205 is configured to be releasably coupled with a USB-A plug device. Further, the first longitudinal contact (e.g., VBUS) of the lower receptacle connection portion 205 is configured to only provide five volts (5V) at up to five hundred milliamps (500 mA).

In another embodiment, the longitudinal contacts associated with ground (e.g., USB Ground, PWR Ground 1, PWR Ground 2) in both the upper and lower receptacle connection portions 203, 205 of the receptacle device 200*a* can be longer than those longitudinal contacts associated with power/data (e.g., D+, D−, VBUS, VPLUS1, VPLUS2) in both the upper and lower receptacle connection portions 203, 205 of the receptacle device 200*a* so as to control the connection or disconnection order of these longitudinal contacts when the USB plug device 100*b* is releasably connected or disconnected with the USB receptacle device 100*a*. In one example, the longitudinal contacts associated with ground are longer than the longitudinal contacts associated with power/data so that the longitudinal contacts associated with ground always connect first or disconnect last relative to the longitudinal contacts associated with power/data. In another example, the length of each longitudinal contact associated with power is different so as to control the connection or disconnection order of power.

Figure 2B:
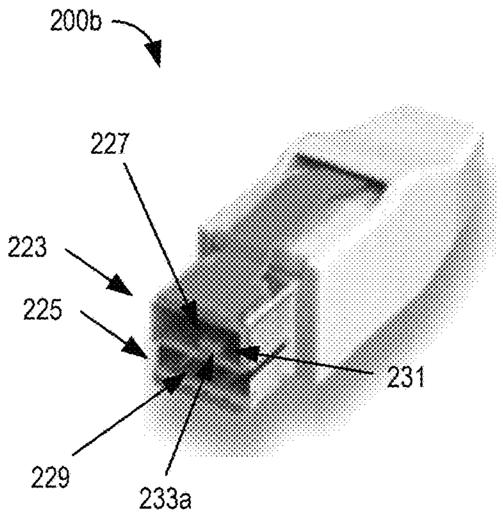
FIG. 2C illustrates one embodiment of a USB cable in accordance with various aspects as described herein.
Figure 3C:
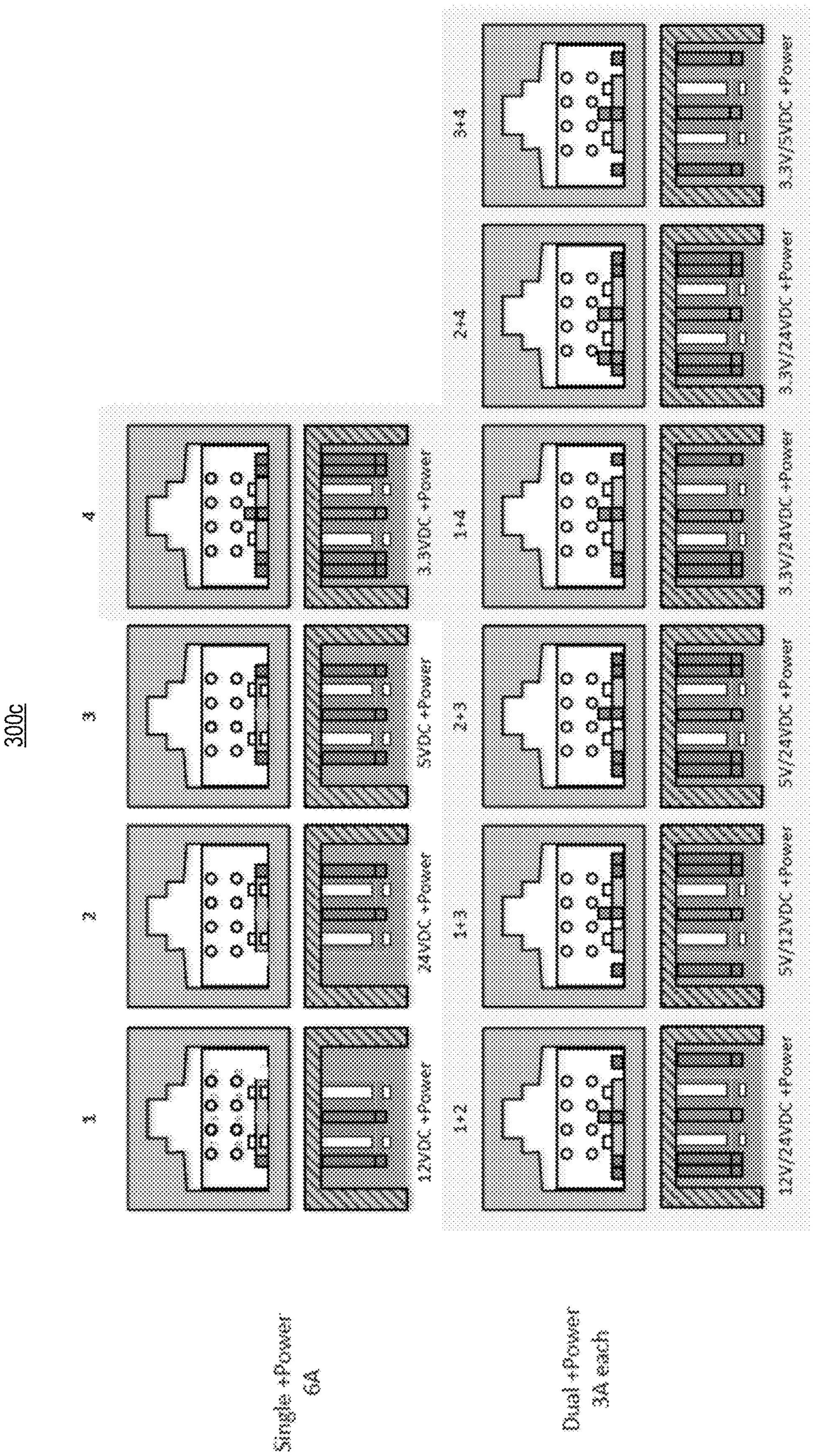
FIG. 3C illustrates embodiments of key arrangements of a reciprocal mechanical key structure of a USB plug device and corresponding voltage assignments on Pin #6 and Pin #7 of the upper plug connection portion of the USB plug device. FIB. 3D is a table summarizing the key arrangements and the corresponding voltage assignments of the USB plug device embodiments of FIG. 3C.

FIB. 2B illustrates one embodiment of a USB plug device 200*b* in accordance with various aspects as described herein. In FIG. 2B, the USB plug device 200*b* can be configured to include upper and lower plug connection portions 223, 225. Further, each plug connection portion 223, 225 can have a set of longitudinal contacts 227, 229 composed of a conducting material. One of the set of longitudinal contacts 229 of the lower plug connection portion 225 can be configured to provide a first voltage. In addition, two of the set of longitudinal contacts 227 of the upper plug connection portion 223 can be configured to provide second and third voltages such as represented by respective Pin #7 and Pin #6 columns of Table 300*d*. The USB plug device can also include a reciprocal mechanical key structure 231 disposed in the upper plug connection portion 223 and composed of an insulating material, with the mechanical key structure 231 having a set of longitudinal keys 233*a* configured in a certain key arrangement such as shown by the various embodiments of FIG. 3C. The reciprocal mechanical key structure 231 can have a set of longitudinal keys 233*a* configured in a certain key arrangement. Each key arrangement can represent a certain assignment of the second and third voltages provided at the two of the set of longitudinal contacts 227 of the upper plug connection portion 223. For example, FIG. 3C illustrates embodiments of key arrangements of a reciprocal mechanical key structure of a USB plug device and corresponding voltage assignments on Pin #6 and Pin #7 of an upper plug connection portion of the USB plug device. Further, FIB. 3D is a table summarizing the key arrangements and the corresponding voltage assignments of the USB plug device embodiments of FIG. 3C. Each key can be positioned adjacently below and parallel to a certain one of the set of longitudinal contacts 227 of the upper plug connection portion 223. The reciprocal mechanical key structure can be configured to be selectively mated and removed along an axis parallel to the set of longitudinal keys 227 with the mechanical key structure 211 of the USB receptacle device 200*a*.

Figure 2C:
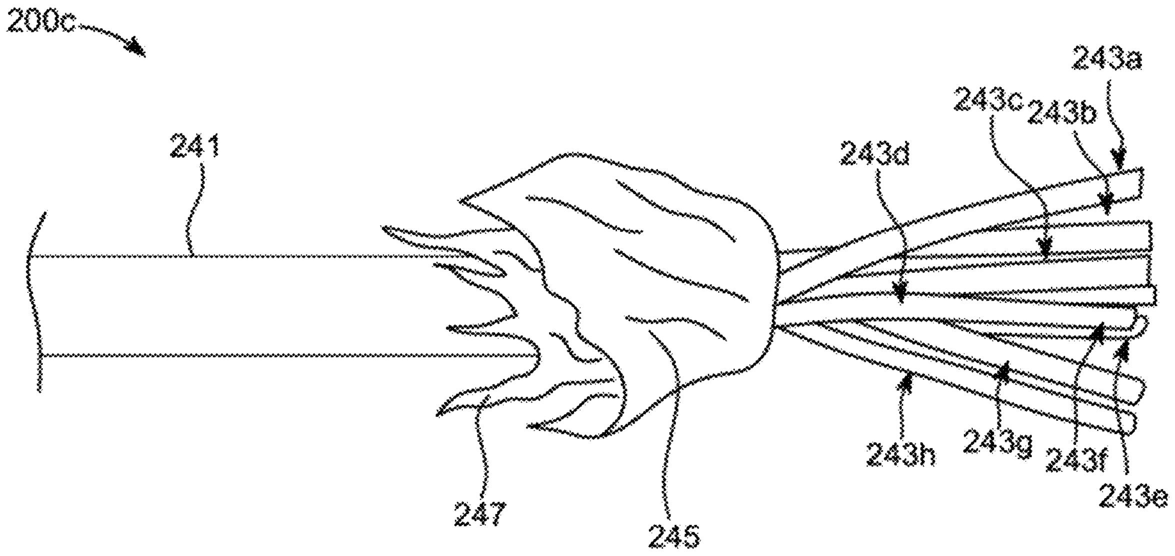

FIG. 2C illustrates one embodiment of a USB cable 200*c* in accordance with various aspects as described herein. In FIG. 2C, the cable 200*c* can be configured to include a housing 241 (e.g., PVC jacket), conductor elements 243*a-h* (e.g., one or more twisted pairs of wires), an inner shield (e.g., metalized polyester tape), an outer shield (e.g., interwoven tinned copper wire), the like, or any combination thereof. In one example, the eight conductor elements 243*a-h* can be configured as four twisted pairs of wires such as a first twisted pair of wires associated with the second longitudinal contact (e.g., D−) and the third longitudinal contact (e.g., D+) of the lower plug connection portion 225, a second twisted pair of wires associated with the first longitudinal contact (e.g., VBUS) and the fourth longitudinal contact (e.g., USB Ground) of the lower plug connection portion 225, a third twisted pair of wires associated with the first longitudinal contact (e.g., PWR Ground 1) and the second longitudinal contact (e.g., VPLUS 1) of the upper plug connection portion 223, and a fourth twisted pair of wires associated with the third longitudinal contact (e.g., VPLUS 2) and the fourth longitudinal contact (e.g., PWR Ground 2) of the upper plug connection portion 223.

Figure 4A:
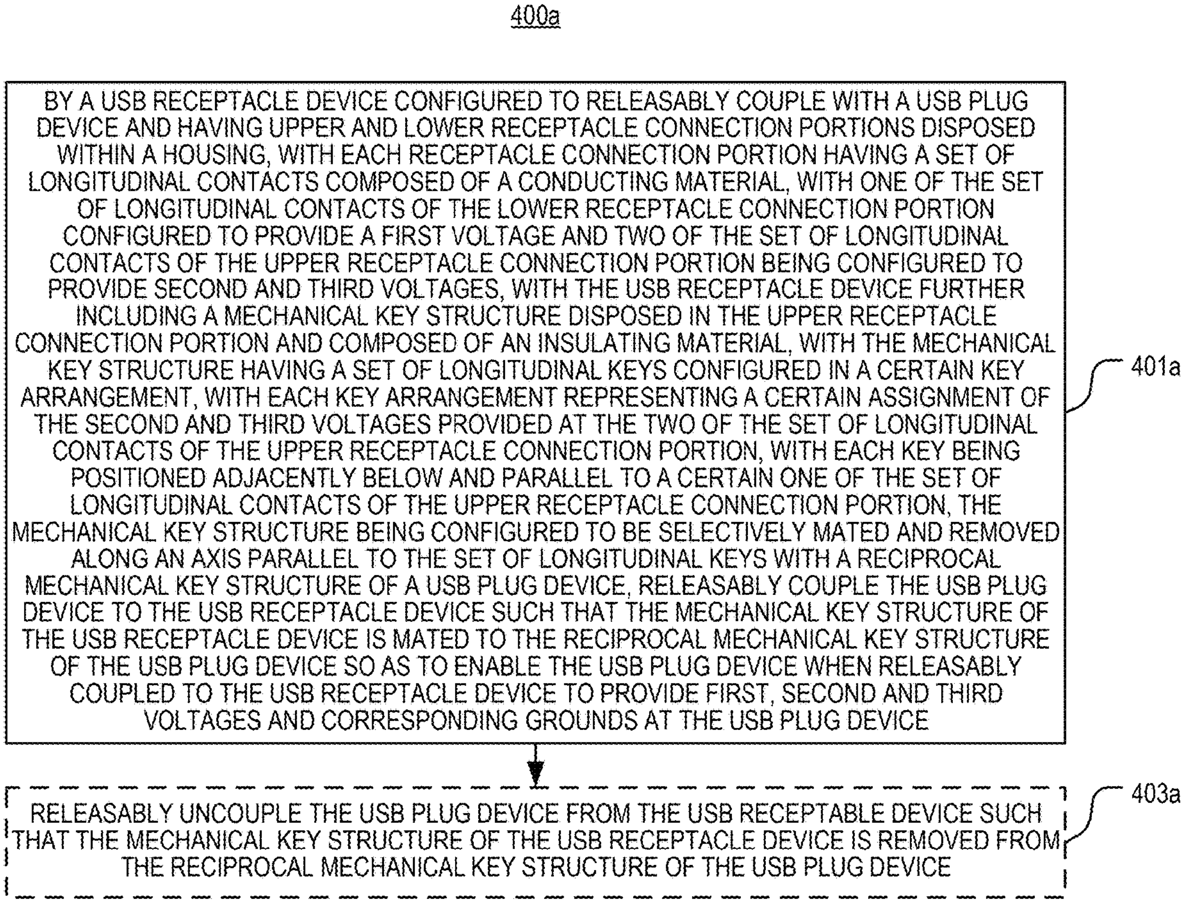
FIG. 4A illustrates one embodiment of a method performed by a USB receptacle device of providing multi-voltage power in accordance with various aspects as described herein.

FIG. 4A illustrates one embodiment of a method 400*a* performed by a USB receptacle device of providing multi-voltage power in accordance with various aspects as described herein. In FIG. 4A, the method 400*a* may start, for instance, at block 401*a* where it includes releasably coupling a USB plug device to the USB receptacle device such that the mechanical key structure of the USB receptacle device is mated to the reciprocal mechanical key structure of the USB plug device. At block 403*a*, the method 400*a* may include releasably uncoupling the USB plug device from the USB receptacle device such that the mechanical key structure of the USB receptacle device is removed from the reciprocal mechanical key structure of the USB plug device.

Figure 4B:
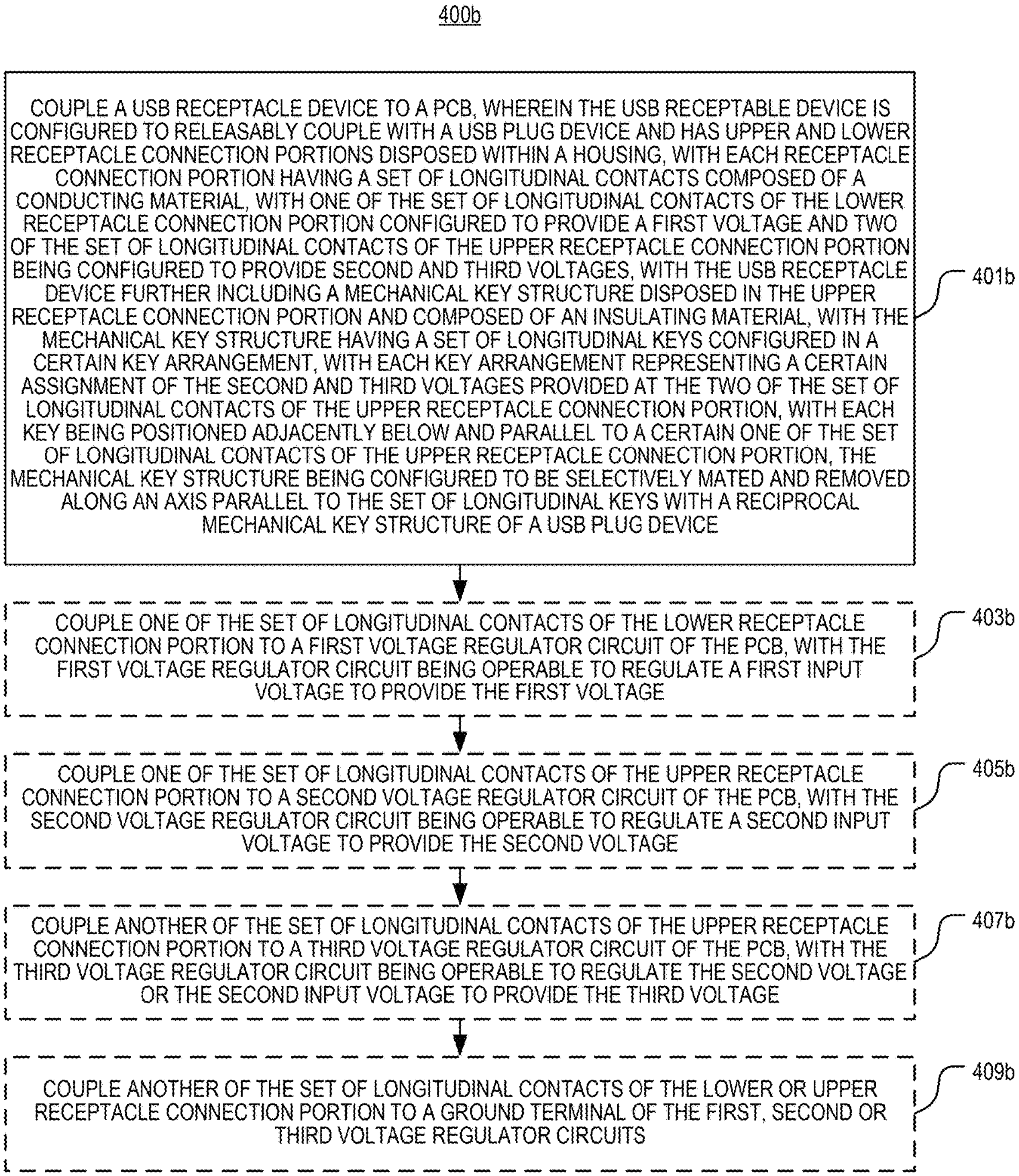
FIG. 4B illustrates one embodiment of a method of manufacturing a USB receptacle device configured to provide multi-voltage power in accordance with various aspects as described herein.

FIG. 4B illustrates one embodiment of a method 400*b* of manufacturing a USB receptacle device configured to provide multi-voltage power in accordance with various aspects as described herein. In FIG. 4B, the method 400*b* may start, for instance, at block 401*b* where it includes coupling the USB receptacle device to a PCB. At block 403*b*, the method 400*b* may include coupling one of the set of longitudinal contacts of the lower receptacle connection portion to a first voltage regulator circuit of the PCB, with the first voltage regulator circuit being operable to regulate a first input voltage to provide the first voltage. At block 405*b*, the method 400*b* may include coupling one of the set of longitudinal contacts of the upper receptacle connection portion to a second voltage regulator circuit of the PCB, with the second voltage regulator circuit being operable to regulate a second input voltage to provide the second voltage. At block 407*b*, the method 400*b* may include coupling another of the set of longitudinal contacts of the upper receptacle connection portion to a third voltage regulator circuit of the PCB, with the third voltage regulator circuit being operable to regulate the second voltage or the second input voltage to provide the third voltage. At block 409*b*, the method 400*b* may include coupling another of the set of longitudinal contacts of the lower or upper receptacle connection portion to a ground terminal associated with the first, second or third voltage regulator circuits.

Figure 4C:
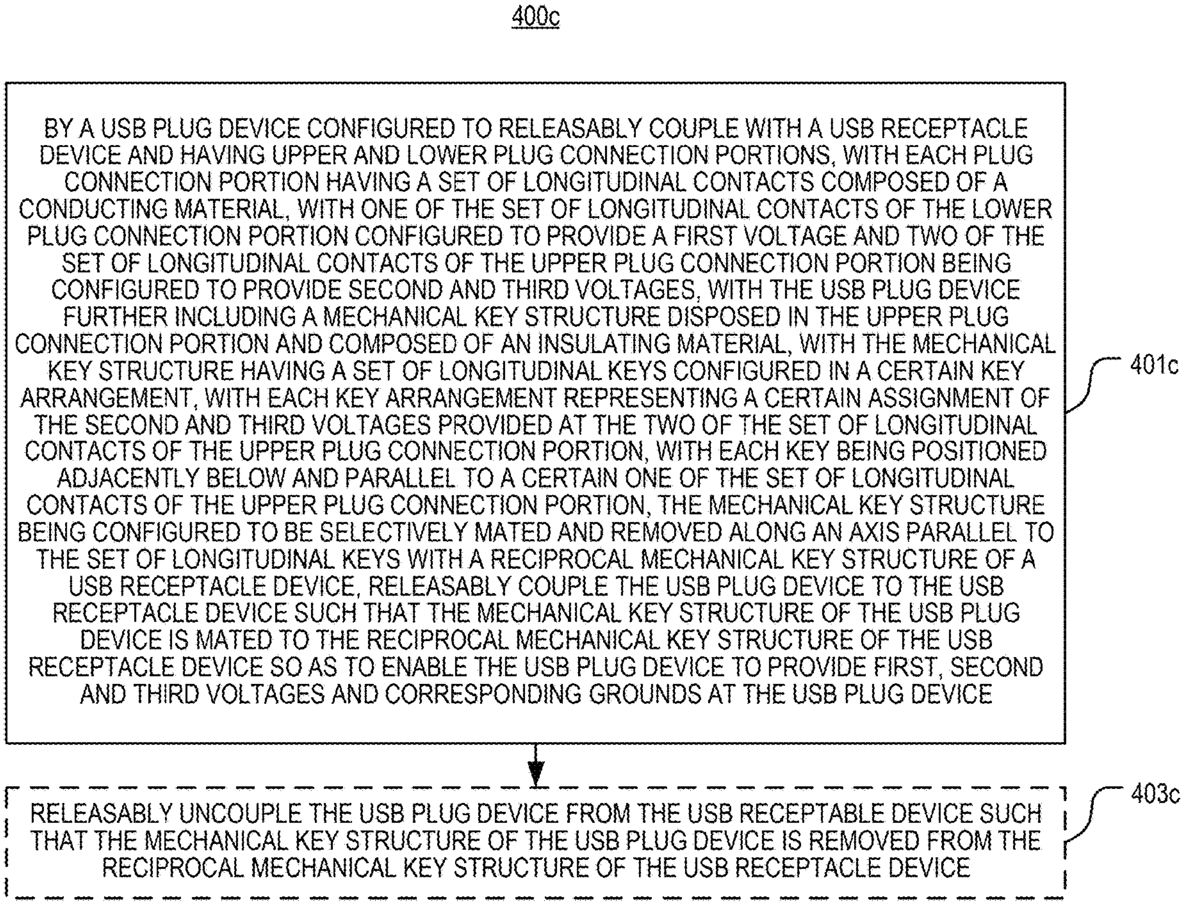
FIG. 4C illustrates one embodiment of a method performed by a USB plug device of providing multi-voltage power in accordance with various aspects as described herein.
Figure 4D:
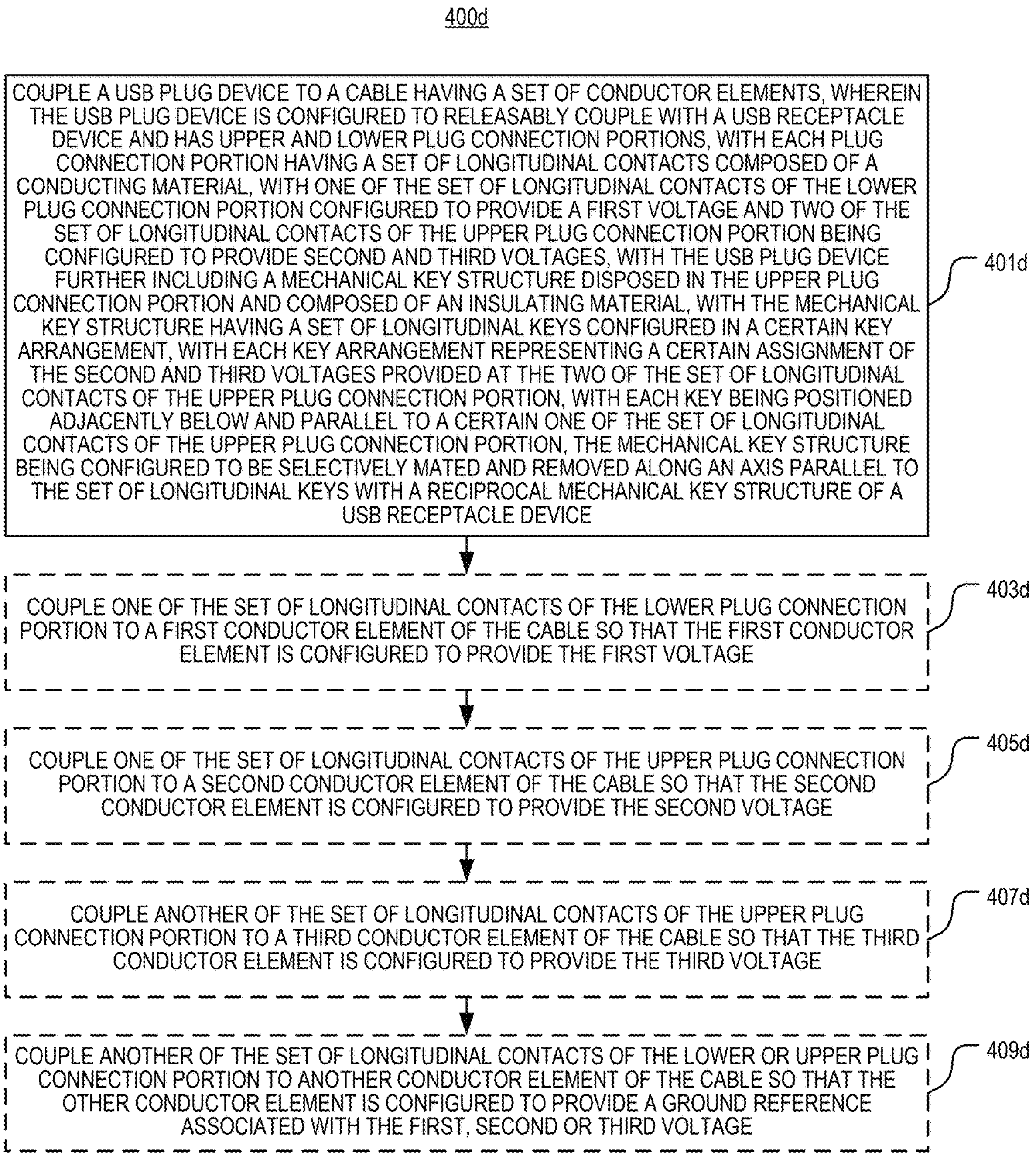
FIG. 4D illustrates one embodiment of a method of manufacturing a USB plug device configured to provide multi-voltage power in accordance with various aspects as described herein.

FIG. 4C illustrates one embodiment of a method 400*c* performed by a USB plug device of providing multi-voltage power in accordance with various aspects as described herein. In FIG. 4C, the method 400*c* may start, for instance, at block 401*c* where it includes releasably coupling the USB plug device to the USB receptacle device such that the mechanical key structure of the USB plug device is mated to the reciprocal mechanical key structure of the USB receptacle device so as to enable the USB plug device to provide first, second and third voltages and corresponding grounds at the USB plug device. At block 403*c*, the method 400*c* may include releasably uncoupling the USB plug device from the USB receptacle device such that the mechanical key structure of the USB plug device is removed from the reciprocal mechanical key structure of the USB receptacle device FIG. 4D illustrates one embodiment of a method of manufacturing a USB plug device configured to provide multi-voltage power in accordance with various aspects as described herein. In FIG. 4D, the method 400*d* may start, for instance, at block 401*d* where it includes coupling a USB plug device to a cable having a set of conductor elements. At block 403*d*, the method 400*d* may include coupling one of the set of longitudinal contacts of the lower plug connection portion to a first conductor element of the cable so that the first conductor element is configured to provide the first voltage. At block 405*d*, the method 400*d* may include coupling one of the set of longitudinal contacts of the upper plug connection portion to a second conductor element of the cable so that the second conductor element is configured to provide the second voltage. At block 407*d*, the method 400*d* may include coupling another of the set of longitudinal contacts of the upper plug connection portion to a third conductor element of the cable so that the third conductor element is configured to provide the third voltage. At block 409*d*, the method 400*d* may include coupling another of the set of longitudinal contacts of the lower or upper plug connection portion to another conductor element of the cable so that the other conductor element is configured to provide a ground reference associated with the first, second or third voltage.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a USB receptacle device includes a housing, upper and lower receptacle connection portions, and a mechanical key structure. The upper and lower receptacle connection portions are disposed within the housing, with each receptacle connection portion having a set of longitudinal contacts composed of a conducting material. Further, one of the set of longitudinal contacts of the lower receptacle connection portion is configured to provide a first voltage and two of the set of longitudinal contacts of the upper receptacle connection portion are configured to provide second and third voltages, with the second and third voltages being different voltages. The mechanical key structure is disposed in the upper receptacle connection portion and is composed of an insulating material. The mechanical key structure also includes a set of longitudinal keys configured in a certain key arrangement, with each key arrangement representing a certain assignment of the second and third voltages provided at the two of the set of longitudinal contacts of the upper receptacle connection portion. Each key is positioned adjacently below and parallel to a certain one of the set of longitudinal contacts of the upper receptacle connection portion. In addition, the mechanical key structure is configured to be selectively mated and removed along an axis parallel to the set of longitudinal keys with a reciprocal mechanical key structure of a USB plug device. The USB receptacle device is configured to releasably couple with the USB plug device such that the mechanical key structure of the USB receptacle device is mated to the reciprocal mechanical key structure of the USB plug device so as to enable the USB plug device to provide the first, second and third voltages at the USB plug device.

In another exemplary embodiment, the first, second and third voltages are associated with first, second and third regulated voltages output by first, second and third regulator circuits.

In another exemplary embodiment, the first and second regulator circuits are configured to regulate first and second input voltages to provide the first and second regulated voltages.

In another exemplary embodiment, the first and second input voltages are the same voltage.

In another exemplary embodiment, the third voltage regulator circuit is configured to regulate the second voltage to provide the third voltage, with the third voltage being less than the second voltage.

In another exemplary embodiment, the two of the set of longitudinal contacts of the upper receptacle connection portion are configured to have a combined output current of no more than a first current threshold (e.g., 6 A).

In another exemplary embodiment, each of the two of the set of longitudinal contacts of the upper receptacle connection portion is configured to output current of no more than a second current threshold (e.g., 3 A).

In another exemplary embodiment, the first current threshold is two times the second current threshold.

In another exemplary embodiment, each set of longitudinal contacts has four longitudinal contacts and the set of longitudinal keys has two keys.

In another exemplary embodiment, the lower receptacle connection portion is configured to releasably couple a USB Type A connector.

In another exemplary embodiment, the USB receptacle device is configured to be coupled to a PCB having first, second and third power planes, with one of the set of longitudinal contacts of the lower receptacle connection portion being configured to couple with the first power plane and the two of the set of longitudinal contacts of the upper receptacle connection portion being configured to couple with the second and third power planes.

In another exemplary embodiment, the set of longitudinal contacts of the upper receptacle connection portion is configured as follows: a first longitudinal contact is configured as a ground associated with the third voltage; a second longitudinal contact is configured provide the third voltage; a third longitudinal contact is configured to provide the second voltage; and an fourth longitudinal contact is configured as a ground associated with the second voltage. Further, the set of longitudinal keys of the mechanical key structure is positioned adjacently below and parallel to two of the first, second, third and fourth contacts of the upper receptacle connection portion.

In another exemplary embodiment, the second voltage is 24V and the third voltage is 1.2V, 1.5V, 3.3V, 5V, or 12V.

In another exemplary embodiment, the second voltage is 12V and the third voltage is 1.2V, 1.5V, 3.3V, or 5V.

In another exemplary embodiment, the second voltage is 5V and the third voltage is 1.2V, 1.5V, or 3.3V.

In another exemplary embodiment, the set of longitudinal contacts of the lower receptacle connection portion is configured as follows: a first longitudinal contact is configured to provide the first voltage; and a fourth longitudinal contact is configured as a ground associated with the first voltage.

In another exemplary embodiment, the first voltage is 5V, 12V, or 24V.

In one exemplary embodiment, a method includes coupling a USB receptacle device to a PCB. The USB receptacle device is configured to releasably couple with a USB plug device and has upper and lower receptacle connection portions disposed within a housing. Each receptacle connection portion includes a set of longitudinal contacts composed of a conducting material, with one of the set of longitudinal contacts of the lower receptacle connection portion configured to provide a first voltage and two of the set of longitudinal contacts of the upper receptacle connection portion being configured to provide second and third voltages, with the second and third voltages being different voltages. Further, the USB receptacle device includes a mechanical key structure disposed in the upper receptacle connection portion and composed of an insulating material. The mechanical key structure also has a set of longitudinal keys configured in a certain key arrangement, with each key arrangement representing a certain assignment of the second and third voltages provided at the two of the set of longitudinal contacts of the upper receptacle connection portion. Each key is positioned adjacently below and parallel to a certain one of the set of longitudinal contacts of the upper receptacle connection portion. In addition, the mechanical key structure is configured to be selectively mated and removed along an axis parallel to the set of longitudinal keys with a reciprocal mechanical key structure of a USB plug device.

In another embodiment, the coupling step further includes coupling one of the set of longitudinal contacts of the lower receptacle connection portion to a first regulator circuit of the PCB, with the first regulator circuit being operable to regulate a first input voltage to provide the first voltage.

In another embodiment, the coupling step further includes coupling a first longitudinal contact of the set of longitudinal contacts of the upper receptacle connection portion to a second regulator circuit of the PCB, with the second regulator circuit being operable to regulate a second input voltage to provide the second voltage; and In another embodiment, the coupling step further includes coupling a second longitudinal contact of the set of longitudinal contacts of the upper receptacle connection portion to a third regulator circuit of the PCB, with the third regulator circuit being operable to regulate the second voltage or the second input voltage to provide the third voltage.

In one exemplary embodiment, a method is performed by USB receptacle device having upper and lower receptacle connection portions disposed within a housing. Each receptacle connection portion includes a set of longitudinal contacts composed of a conducting material, with one of the set of longitudinal contacts of the lower receptacle connection portion configured to provide a first voltage and two of the set of longitudinal contacts of the upper receptacle connection portion being configured to provide second and third voltages, with the second and third voltages being different voltages. The USB receptacle device also including a mechanical key structure disposed in the upper receptacle connection portion and composed of an insulating material, with the mechanical key structure having a set of longitudinal keys configured in a certain key arrangement. Each key arrangement represents a certain assignment of the second and third voltages provided at the two of the set of longitudinal contacts of the upper receptacle connection portion. Each key is also positioned adjacently below and parallel to a certain one of the set of longitudinal contacts of the upper receptacle connection portion. In addition, the mechanical key structure is configured to be selectively mated and removed along an axis parallel to the set of longitudinal keys with a reciprocal mechanical key structure of a USB plug device. The method includes releasably coupling a USB plug device to the USB receptacle device such that the mechanical key structure is selectively mated to the reciprocal mechanical key structure of the USB plug device so as to enable the USB plug device when releasably coupled to the USB receptacle device to provide first, second and third output voltages and corresponding grounds.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term “article of manufacture” as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as “first” and “second,” and the like may be used solely to distinguish one entity or action from another entity or action without necessarily requiring or implying any actual such relationship or order between such entities or actions. The term “or” is intended to mean an inclusive “or” unless specified otherwise or clear from the context to be directed to an exclusive form. Further, the terms “a,” “an,” and “the” are intended to mean one or more unless specified otherwise or clear from the context to be directed to a singular form. The term “include” and its various forms are intended to mean including but not limited to. References to “one embodiment,” “an embodiment,” “example embodiment,” “various embodiments,” and other like terms indicate that the embodiments of the disclosed technology so described may include a particular function, feature, structure, or characteristic, but not every embodiment necessarily includes the particular function, feature, structure, or characteristic. Further, repeated use of the phrase “in one embodiment” does not necessarily refer to the same embodiment, although it may. The terms “substantially,” “essentially,” “approximately,” “about” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is “configured” in a certain way is configured in at least that way, but may also be configured in ways that are not listed.

What is claimed is:

1. A universal serial bus (USB) receptacle device, comprising:

upper and lower receptacle connection portions disposed within a housing, with each receptacle connection portion having four longitudinal contacts composed of a conducting material, with one longitudinal contact of the lower receptacle connection portion configured to provide a first voltage and two longitudinal contacts of the upper receptacle connection portion being configured to provide second and third voltages, with the second and third voltages being different voltages;

a mechanical key structure disposed in the upper receptacle connection portion and composed of an insulating material, with the mechanical key structure including an integrally formed body having an upper longitudinal portion disposed about the four longitudinal contacts of the upper receptacle connection portion, two longitudinal keys spatially positioned below and parallel to two corresponding longitudinal contacts of the upper receptacle connection portion, and two longitudinal channels spatially positioned below and parallel to the other two longitudinal contacts of the upper receptacle connection portion and adjacent the two longitudinal keys, the longitudinal channels being at least partially defined by surrounding structural elements including the upper longitudinal portion and at least one longitudinal key, the two longitudinal keys and the two longitudinal channels configured in one of a set of predefined key arrangements, with each key arrangement representing a certain assignment of the second and third voltages provided at the two longitudinal contacts of the upper receptacle connection portion, the mechanical key structure being configured to operate in conjunction with a reciprocal mechanical key structure of a USB plug device that has a reciprocal arrangement corresponding to the predefined key arrangement, such that the reciprocal mechanical key structure is physically alignable with and fits into the mechanical key structure only when the reciprocal arrangement matches the corresponding key arrangement; and wherein the USB receptacle device is configured to releasably mechanically couple with the USB plug device such that the mechanical key structure of the USB receptacle device is mated to the reciprocal mechanical key structure of the USB plug device so as to enable the USB plug device to provide the first, second and third voltages.

2. The device of claim 1, wherein the first, second and third voltages are associated with first, second and third regulated voltages output by first, second and third voltage regulator circuits.

3. The device of claim 2, wherein the first and second voltage regulator circuits are configured to regulate first and second input voltages to provide the first and second regulated voltages.

4. The device of claim 3, wherein the first and second input voltages are the same voltage.

5. The device of claim 2, wherein the third voltage regulator circuit is configured to regulate the second voltage to provide the third voltage, with the third voltage being less than the second voltage.

6. The device of claim 1, wherein the two longitudinal contacts of the upper receptacle connection portion are configured to have a combined output current of no more than a first current threshold.

7. The device of claim 6, wherein each of the two longitudinal contacts of the upper receptacle connection portion is configured to output current of no more than a second current threshold.

8. The device of claim 7, wherein the first current threshold is two times the second current threshold.

9. The device of claim 1, wherein the lower receptacle connection portion is configured to releasably couple a USB Type A connector.

10. The device of claim 1, wherein the USB receptacle device is configured to be coupled to a printed circuit board (PCB) having first, second and third power planes, with the one longitudinal contact of the lower receptacle connection portion being configured to couple with the first power plane and the two longitudinal contacts of the upper receptacle connection portion being configured to couple with the second and third power planes.

11. The device of claim 1, wherein the four longitudinal contacts of the upper receptacle connection portion are configured as follows:

a first longitudinal contact is configured as a ground associated with the third voltage;

a second longitudinal contact is configured to provide the third voltage;

a third longitudinal contact is configured to provide the second voltage; and a fourth longitudinal contact is configured as a ground associated with the second voltage; and wherein the two longitudinal keys of the mechanical key structure are positioned adjacently below and parallel to two of the first, second, third and fourth contacts.

12. The device of claim 1, wherein the second voltage is 24 volts and the third voltage is 1.2 volts, 1.5 volts, 3.3 volts, 5 volts, or 12 volts.

13. The device of claim 1, wherein the second voltage is 12 volts and the third voltage is 1.2 volts, 1.5 volts, 3.3 volts, or 5 volts.

14. The device of claim 1, wherein the second voltage is 5 volts and the third voltage is 1.2 volts, 1.5 volts, or 3.3 volts.

15. The device of claim 1, wherein two of the four longitudinal contacts of the lower receptacle connection portion are configured as follows:

a first longitudinal contact is configured to provide the first voltage; and a fourth longitudinal contact is configured as a ground associated with the first voltage.

16. The device of claim 1, wherein the first voltage is 5 volts.

17. A method, comprising:

electrically coupling a universal serial bus (USB) receptacle device to a printed circuit board (PCB) having first, second and third voltage regulator circuits with each voltage regulator circuit being operable to regulate an input voltage to provide an output voltage at an output terminal of that voltage regulator circuit, wherein the USB receptacle device is configured to releasably mechanically couple with a USB plug device and has upper and lower receptacle connection portions disposed within a housing, with each receptacle connection portion having four longitudinal contacts composed of a conducting material, with one longitudinal contact of the lower receptacle connection portion configured to provide a first voltage via the first voltage regulator circuit and two longitudinal contacts of the upper receptacle connection portion being configured to provide second and third voltages via respective second and third voltage regulator circuits, with the second and third voltages being different voltages, the USB receptacle device further including a mechanical key structure disposed in the upper receptacle connection portion and composed of an insulating material, with the mechanical key structure including an integrally formed body having an upper longitudinal portion disposed about the four longitudinal contacts of the upper receptacle connection portion, two longitudinal keys spatially positioned below and parallel to two corresponding longitudinal contacts of the upper receptacle connection portion, and two longitudinal channels spatially positioned below and parallel to the other two longitudinal contacts of the upper receptacle connection portion and adjacent the two longitudinal keys, the longitudinal channels being at least partially defined by surrounding structural elements including the upper longitudinal portion and at least one longitudinal key, the two longitudinal keys and the two longitudinal channels configured in one of a set of predefined key arrangements, with each key arrangement representing a certain assignment of the second and third voltages provided at the two longitudinal contacts of the upper receptacle connection portion, the mechanical key structure being configured to mate with a reciprocal mechanical key structure of the USB plug device, that has a reciprocal arrangement corresponding to the predefined key arrangement, such that the reciprocal mechanical key structure is physically alignable with and fits into the mechanical key structure only when the reciprocal arrangement matches the corresponding key arrangement.

18. The method of claim 17, wherein the electrically coupling step includes:

electrically coupling the one longitudinal contact of the lower receptacle connection portion to the output terminal of the first voltage regulator circuit of the PCB, with the first voltage regulator circuit being operable to regulate a first input voltage to provide the first voltage at the output terminal of the first voltage regulator circuit;

electrically coupling a first longitudinal contact of the two longitudinal contacts of the upper receptacle connection portion to the output terminal of the second voltage regulator circuit of the PCB, with the second voltage regulator circuit being operable to regulate a second input voltage to provide the second voltage at the output terminal of the second volatge regulator circuit; and electrically coupling a second longitudinal contact of the two longitudinal contacts of the upper receptacle connection portion to the output terminal of the third voltage regulator circuit of the PCB, with the third voltage regulator circuit being operable to regulate the second voltage or a voltage at an input terminal of the second regulator circuit to provide the third voltage at the output terminal of the third voltage regulator circuit.

19. A printed circuit board (PCB), comprising:

first, second, and third voltage regulator circuits, each operable to regulate an input voltage to provide a certain output voltage at an output terminal; and a USB receptacle device configured to releasably mechanically couple with a USB plug device, the receptacle device including:

upper and lower receptacle connection portions disposed within a housing, each receptacle connection portion having four longitudinal contacts composed of a conducting material, wherein one longitudinal contact of the lower receptacle connection portion is configured to provide a first voltage via the first voltage regulator circuit, and two longitudinal contacts of the upper receptacle connection portion are configured to provide second and third voltages via the corresponding second and third voltage regulator circuits, the second and third voltages being different voltages; and a mechanical key structure disposed in the upper receptacle connection portion and composed of an insulating material, the mechanical key structure including an integrally formed body having an upper longitudinal portion disposed about the four longitudinal contacts of the upper receptacle connection portion, two longitudinal keys spatially positioned below and parallel to two corresponding longitudinal contacts, and two longitudinal channels spatially positioned below and parallel to the other two longitudinal contacts and adjacent the two longitudinal keys, the channels being at least partially defined by surrounding structural elements including the upper longitudinal portion and at least one longitudinal key, wherein the two longitudinal keys and the two longitudinal channels are configured in one of a set of predefined key arrangements, each key arrangement representing a certain assignment of the second and third voltages, and wherein the mechanical key structure of the USB receptacle device is configured to mate with a reciprocal mechanical key structure of the USB plug device that has a reciprocal arrangement corresponding to the predefined key arrangement such that the reciprocal mechanical key structure physically aligns with and fits into the mechanical key structure only when the reciprocal arrangement matches the corresponding key arrangement.

* * * * *